(12) United States Patent
Wang

(10) Patent No.: US 11,150,397 B2
(45) Date of Patent: Oct. 19, 2021

(54) LIGHT GUIDE STRUCTURE AND MANUFACTURING METHOD THEREFOR, BACKLIGHT MODULE, AND DISPLAY APPARATUS

(71) Applicants: BOE OPTICAL SCIENCE AND TECHNOLOGY CO., LTD., Jiangsu (CN); BOE TECHNOLOGY GROUP CO., LTD., Beijing (CN)

(72) Inventor: Tao Wang, Beijing (CN)

(73) Assignees: BOE OPTICAL SCIENCE AND TECHNOLOGY CO., LTD., Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 53 days.

(21) Appl. No.: 16/618,299

(22) PCT Filed: Apr. 25, 2019

(86) PCT No.: PCT/CN2019/084347
§ 371 (c)(1),
(2) Date: Nov. 29, 2019

(87) PCT Pub. No.: WO2019/218852
PCT Pub. Date: Nov. 21, 2019

(65) Prior Publication Data
US 2021/0165152 A1     Jun. 3, 2021

(30) Foreign Application Priority Data
May 18, 2018  (CN) .......................... 201820746891.9

(51) Int. Cl.
*F21V 8/00* (2006.01)
(52) U.S. Cl.
CPC .......... *G02B 6/004* (2013.01); *G02B 6/0055* (2013.01); *G02B 6/0065* (2013.01)
(58) Field of Classification Search
None
See application file for complete search history.

(56) References Cited

U.S. PATENT DOCUMENTS

2013/0301294 A1    11/2013   Lai

FOREIGN PATENT DOCUMENTS

| CN | 102809776 A | 12/2012 |
| CN | 103513321 A | 1/2014 |
| CN | 103675987 A | 3/2014 |
| CN | 208421297 U | 1/2019 |
| JP | 2009043471 A | 2/2009 |

OTHER PUBLICATIONS

Chinese Office Action Application No. 201820746891.9; dated Oct. 17, 2018.

*Primary Examiner* — Vip Patel

(57) ABSTRACT

A light guide structure, a manufacturing method of the light guide structure, a module and a display device are provided. The light guide structure includes: at least two light guide layers; and a plurality of dot structures between adjacent ones of the light guide layers.

20 Claims, 5 Drawing Sheets

LIGHT GUIDE STRUCTURE AND MANUFACTURING METHOD THEREFOR, BACKLIGHT MODULE, AND DISPLAY APPARATUS

BACKLIGHT MODULE AND DISPLAY APPARATUS

This application claims the benefit of Chinese patent application No. 201820746891.9 filed on May 18, 2018, which is hereby entirely incorporated by reference as a part of the present application.

TECHNICAL FIELD

Embodiments of the present disclosure relate to a light guide structure, a manufacturing method of the light guide structure, a backlight module and a display device.

BACKGROUND

Light guide plate (LGP) is a main component that converts a point light source or a line light source into a surface light source in small-sized or medium-sized backlight source, the light guide plate is applicable to flat display devices such as a liquid crystal display, a notebook computer, a digital camera, a monitor, a projector and the like, and the light guide plate is used to provide the surface light source with uniform brightness so that the flat display devices display images normally.

In the process of manufacturing the light guide plate, dot structures are usually arranged at a surface (such as an upper surface, a lower surface or a side surface) of the light guide plate to improve the uniformity of the light emitted from the light guide plate, but how to form the dot structures inside the light guide plate still has difficulties.

SUMMARY

According to embodiments of the present disclosure, a light guide structure is provided and includes: at least two light guide layers; and a plurality of dot structures between adjacent ones of the light guide layers.

For example, a total amount of the at least two light guide layers is N, the light guide structure comprises the plurality of dot structures of N–1 layer, and N is a positive integer greater than or equal to 2.

For example, the at least two light guide layers comprise a first light guide layer and a second light guide layer; the first light guide layer has a first inner surface which faces the second light guide layer and has a plurality of first concave dots; the second light guide layer has a first inner surface Which faces the first light guide layer and has a plurality of second concave dots; and the plurality first concave dots and the plurality of second concave dots correspond to each other in positions and constitute the plurality of dot structures.

For example, the at least two light guide layers comprise a first light guide layer, a second light guide layer and a third light guide layer; the first light guide layer has a first inner surface which faces the second light guide layer and has a plurality of first concave dots; the second light guide layer has a first inner surface, which faces the first light guide layer and has a plurality of second concave dots; and the plurality of first concave dots and the plurality of second concave dots correspond to each other in positions and constitute the plurality of dot structures; the second light guide layer has a second inner surface, which faces the third light guide layer and has a plurality of third concave dots; the third light guide layer has a first inner surface, which faces the second light guide layer and has a plurality of fourth concave dots; and the plurality of third concave dots and the plurality of fourth concave dots correspond to each other in positions and constitute the plurality of dot structures.

For example, the plurality of dot structures are equal in size and unequal in density, a density of the plurality of dot structures is increased as distances from the plurality of dot structures to a light source become larger, and the light guide structure is configured to receive and transmit light from the light source.

For example, the plurality of dot structures have a same density and unequal sizes, the plurality of dot structures become larger as distances from the plurality of dot structures to a light source become larger, and the light guide structure is configured to receive and transmit light front the light source.

For example, a softening layer is at a position, other than the plurality of dot structures, between the adjacent ones of the light guide layers.

For example, a material of the at least two light guide layers is a transparent resin, and a material of the softening layer is a transparent ceramic material or a transparent polymer composite material.

Far example, the light guide structure has a thickness of 0.2 mm to 6 mm.

For example, each of the plurality of dot structures is symmetrical with respect to a contact interface between the adjacent ones of the light guide layers.

For example, a crass-sectional shape of each of the plurality of dot structures is a circle in a direction perpendicular to the light guide structure, and a diameter of the circle is from 10 µm to 200 µm.

For example, each of the plurality of dot structures is a hollow dot structure.

According to the embodiments of the present disclosure, a backlight module is provided and comprises the light guide structure as described above.

For example, the backlight module further comprises: a reflective coating layer on a surface of the light guide structure.

For example, the reflective coating layer is white ink or white paint and has a thickness of 0.02 ram to 0.7 mm.

According to the embodiments of the present disclosure, a display device is provided and comprises: the backlight module as described above; and a display panel on a light emission side of the backlight module.

According to the embodiments of the present disclosure, a manufacturing method of a light guide structure is provided and comprises: forming at least two light guide layers; and forming a plurality of dot structures between adjacent ones of the light guide layers.

For example, the manufacturing method comprises: forming a first light guide layer and a second light guide layer; forming a plurality of first concave dots in the first light guide layer, forming a plurality of second concave dots in the second light guide layer, forming a first softening layer at a position of the first light guide layer other than the plurality of first concave dots, forming a second softening layer at a position of the second light guide layer other than the plurality of second concave dots; pressing the first light guide layer and the second light guide layer together; and performing a heating treatment, so that the first softening layer and the second softening layer are softened to connect the first light guide layer and the second light guide layer together.

For example, the plurality of dot structures are formed between the adjacent ones of the light guide layers by laser ablation.

For example, before the laser ablation, the method further comprises: converging a laser light with a convex lens.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not imitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
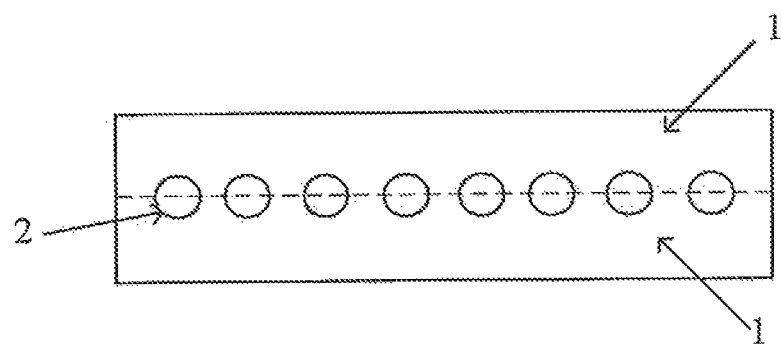
FIG. 1a is a schematic structural view showing a light guide structure according to embodiments of the present disclosure.

FIG. 1a is a schematic view of a light guide structure provided by the embodiments of the present disclosure. For example, the light guide structure is a light guide plate or a light guide film. As shown in FIG. 1a, the light guide structure includes at least two light guide layers 1, and a plurality of dot structures 2 are disposed between adjacent ones of the light guide layers.

For example, each of the plurality of dot structures 2 has a symmetrical structure with respect to a contact interface between the adjacent ones of the light guide layers 1. In this way, the design is simplified and the process is easy. For example, in a direction perpendicular to the light guide structure, a cross-sectional shape of each of the plurality of dot structures 2 is a circle. However, the embodiments of the present disclosure are not limited thereto, and the cross-sectional shape of each of the plurality of dot structures 2 is, for example, any suitable shape such as an ellipse, a rectangle s 7 the like in the direction perpendicular to the light guide structure.

For example, as shown in FIG. 1a, each of the plurality of dot structures 2 is a hollow dot structure.

According to the light guide structure provided by the embodiments of the present disclosure, on one hand, the light guide structure is formed by at least two light guide layers, and the plurality of dot structures are disposed between the adjacent ones of the light guide layers, so as to realize that the dot structures of the light guide structure are arranged inside the light guide structure, which improves the image excellence rate; on the other hand, the light guide structure formed of the plurality of light guide layers improves the concealment performance of the light guide structure, improves the luminous effect and achieves the effect of high brightness.

Next, by taking the light guide structure including two light guide layers as an example, the light guide structure in the embodiments of the present disclosure will be described in detail in conjunction with FIGS. 1a-2c and 2a-2b).

For example, as shown in FIG. 1a, the light guide structure includes two light guide layers 1, and the plurality of dot structures 2 are disposed between the two light guide layers 1.

Figure 1B:
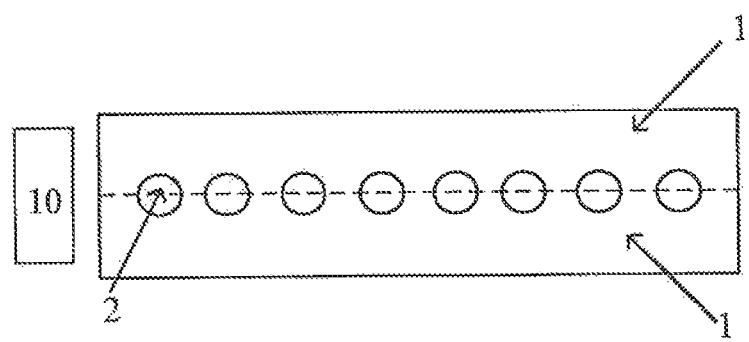
FIG. 1b is a schematic structural view showing a light source located at a lateral side of the light guide structure provided by the embodiments of the present disclosure.
Figure 1C:
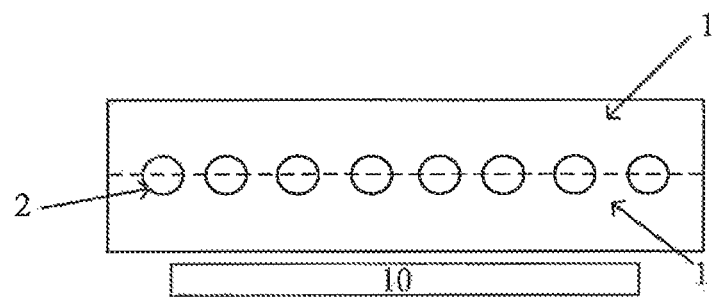
FIG. 1c is a schematic structural view showing that the light source is located below the light guide structure provided by the embodiments of the present disclosure.
Figure 2A:
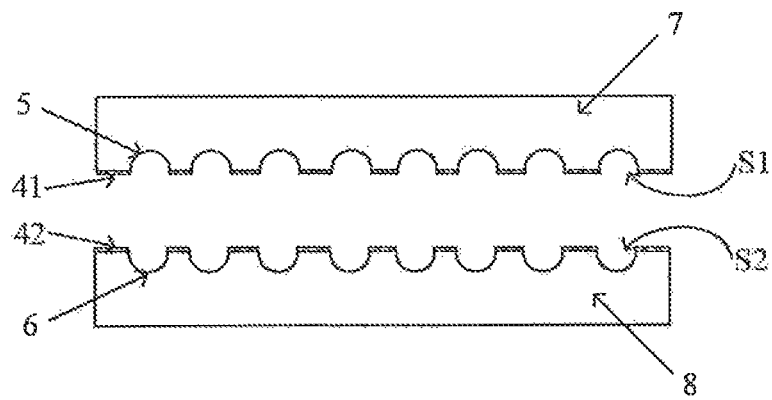
FIG. 2a is a schematic structural view showing the light guide structure before being pressed together according to the embodiments of the present disclosure.

FIG. 2a is a schematic structural view of the two light guide layers of the light guide structure before being pressed together provided by the embodiments of the present disclosure. As shown in FIG. 2a, the light guide structure includes a first light guide layer 7 and a second light guide layer 8, the first light guide layer 7 has a plurality of first concave dots 5 at a first inner surface S1, which faces the second light guide layer 8, the second light guide layer 8 has a plurality of second concave dots 6 at a first inner surface S2 which faces the first light guide layer 7, and positions of the plurality of first concave dots 5 correspond to positions of the plurality of second concave dots 6, respectively. After the first light guide layer 7 and the second light guide layer 8 are bonded with each other, the plurality of first concave dots 5 are respectively aligned with the plurality of second concave dots 6 in a one-to-one manner to form the plurality of dot structures, which is the dot structures 2 in FIG. 1.

In the embodiments of the present disclosure, each first concave dot 5 and each second concave dot 6 are, for example, semicircular. As shown in FIG. 2a, the first concave dot 5 is a semicircle having only an upper half, and the second concave dot 6 is a semicircle having only a lower half; after the first light guide layer 7 and the second light guide layer are bonded with each other, circle centers of the two semicircles coincide to form a complete circular dot. The semicircular concave dots are, for example, conveniently formed at the surface of the light guide layer by means of laser light or the like.

For example, a material of each of the first light guide layer 7 and the second light guide layer 8 is a transparent resin or other transparent material. For example, the light guide layers and the concave dots at the light guide layers are formed by injection molding.

For example, the light guide structure shown in FIG. 1a is formed by pressing the first light guide layer 7 and the second light guide layer 8 together.

Figure 2B:
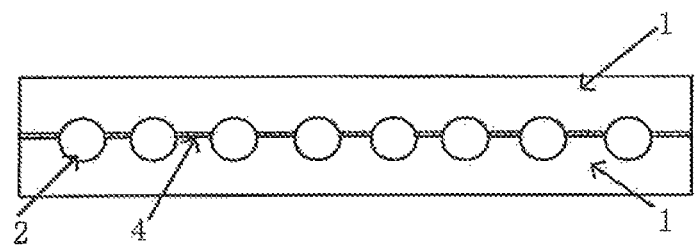
FIG. 2b is a schematic structural view showing the light guide structure after being pressed together according to the embodiments of the present disclosure.

For example, a first softening layer 41 is disposed on the first inner surface S1 of the first light guide layer 7, the first softening layer 41 is located in a spacing region between adjacent ones of the plurality of first concave dots 5; a second softening layer 42 is disposed on the first inner surface 82 of the second light guide layer 8, the second softening layer 42 is located at a spacing region between adjacent ones of the plurality of second concave dots 6; the first softening layer 41 and the second softening layer 42 are pressed and heated into a one-piece body to obtain a softening layer 4. Thereby, the light guide structure shown in FIG. 2b is obtained. The light guide structure shown in FIG. 2b differs from the light guide structure shown in FIG. 1a is in that the softening layer 4 is provided at a position other than the plurality of dot structures 2 between the adjacent ones of the light guide layers.

For example, a material of each of the first softening layer 41 and the second softening layer 42 is a softening material which is transparent and is capable of being changed to be in a molten state after being heated, such as a transparent ceramic material, a transparent polymer composite material or the like.

For example, the softening layer is formed by performing another injection molding after the light guide layer is formed; or the softening layer is formed in a way that a film coating is firstly performed on the surface of the light guide layer and then an etching process is performed to retain a portion of the coated film outside regions of the concave dots, so that the softening layer is formed in the spacing region between the adjacent concave dots. The softening layer becomes molten after being heated, so that the two light guide layers are attached and fixed together, and thus the interface formed by directly attaching the two light guide layers together is avoided; and by heating to soften the softening layer, the two light guide layers are bonded together into the one-piece body, which reduces optical energy loss caused by the interface between different light guide layers.

For example, the plurality of dot structures are equal in size. For example, in the direction perpendicular to the light guide structure, the cross-sectional shape of each of the plurality of dot structures 2 is a circle, and a diameter of the circle is from 10 μm to 200 μm. Because the dot structures between the adjacent ones of the light guide layers have a same size, the uniformity of the displayed image is improved, the difficulty of the optical design is reduced, and the processing is easy. In addition, the suitable size of the diameter of the circle for example is selected according to the actual requirements; for example, in the fields of smart phone (SP), tablet PC (TPC), vehicle, industrial control and the like, the diameter of the dot structure is selected from 10 μm to 50 μm. For example, in the fields of monitor (MNT) and television (TV), the diameter of the dot structure is selected from 50 μm to 200 μm.

For example, the plurality of dot structures are equal in size and unequal in density. For example, the light guide structure is configured to receive and transmit light from a light source. For example, the distribution of the dot structures is set according to distances from the dot structures to the light source. As the distances from the dot structures to the light source become larger, the density of the dot structures become denser; that is, the farther away from the light source the dot structures are, the denser the dot structures are, and the closer to the light source the dot structures are, the more sparse the dot structures are, in this way, by appropriately adjusting the density of the dot structures according to the distances from the dot structures to the light source, the problem that brightness of a region near the light source is relatively high is solved, and thereby the uniformity of the displayed image is improved. As shown in FIG. 1b and FIG. 1c, the light source 10 is provided as a direct type or a side-in type. In FIG. 1b, the light source 10 is of the side-in type, the light source 10 is disposed at a lateral side of the light guide structure; in this case, for example, the density the dot structures is gradually increased from an edge of the light guide structure to a center of the light guide structure. In FIG. 1c, the light source 10 is of the direct type, the light source 10 is disposed at a bottom of the light guide structure; in this case, for example, the density of the dot structures is gradually reduced from the edge of the light guide structure to the center of the light guide structure.

For example, the dot structures have the same density, and the sizes of the dot structures are not equal. For example, the dot structures of different sizes are set according to the distances from the dot structures to the light source. The dot structures become larger as the distances from the dot structures to the light source become larger; that is, the farther away from the light source the dot structure is, the larger the dot structure is, and the closer to the light source the dot structure is, the smaller the dot structure is. In this way, by appropriately adjusting the sizes of the dot structures according to the distances from the dot structures to the light source, the problem that the brightness of the region near the light source is relatively high is solved, and thereby the uniformity of the displayed image is improved. As shown in FIG. 1b and FIG. 1c, the light source 10 is provided as the direct type or the side-in type. As shown in FIG. 1b, the light source 10 is of the side-in type, the light source 10 is disposed at the lateral side of the light guide structure, and the sizes of the dot structures are gradually increased from the edge of the light guide structure to the center of the light guide structure; that is, the closer to the light source the dot structure is, the smaller the grid dot is, and the farther away from the light source the dot structure is, the larger the dot structure is. As shown in FIG. 1c, the light source 10 is of the direct type, the light source 10 is disposed at the bottom of the light guide structure, and the sizes of the dot structures are gradually reduced from the edge of the light guide structure to the center of the light guide structure; that is, the dot structures in a region directly above the light source 10 are relatively small, and the dot structures being in the edge region of the light guide source and being away from the light source 10 are relatively large.

It should be noted that, in FIGS. 1a-1c and FIGS. 2a-2b, only the structural schematic views of the dot structures located inside the light guide structure are shown, and the change of the density and/or size of the dot structures are not shown; but in actual use, the density and/or size of the dot structures are adjusted according to the needs.

It should be noted that the light guide structure in the embodiments of the present disclosure is applicable to the light guide plate or the light guide film having a thickness of 0.2 mm to 6 mm. For example, for application in the fled of smart phone (SP), the thickness of the light guide plate or the light guide film is from 0.2 mm to 0.5 mm; for application in the fields of tablet PC (TPC), vehicle, industrial control and the like, the thickness of the light guide plate or the light guide film is from 0.5 mm to 2.0 mm; for application in the fields of monitor (MNT) and television (TV) and the like, the thickness of the light guide plate or the light guide film is from 1.5 mm to 3.0 mm; for application in the fields of industrial control and television (TV) and so on, the thickness of the light guide plate or the light guide film is from 3.0 mm to 6.0 mm.

The light guide structure shown in FIGS. 1a-1c and FIGS. 2a-2b includes two light guide layers, so that the concealment performance of the light guide structure is better than that of the light guide structure comprising a single light guide layer in the conventional technology, and the image excellence rate is improved. For example, the image excellence rate of the conventional light guide structure comprising the single light guide layer reaches 85%, and the image excellence rate of the light guide structure comprising the two light guide layers is increased to 92% or more. In addition, in the embodiments of the present disclosure, the duty ratio of the dot structures is greatly improved, and the luminous effect improvement reaches 30% or more.

The light guide structure in the embodiments of the present disclosure is not limited to the light guide plate, and may be other transparent components or products.

In summary, according to the light guide structure provided by the embodiments of the present disclosure, on one hand, the light guide structure is formed by at least two light guide layers, and the plurality of dot structures are disposed between the adjacent ones of the light guide layers, so as to realize that the dot structures of the light guide structure are arranged inside the light guide structure, which improves the image excellence rate; on the other hand, the light guide structure formed of the plurality of light guide layers further improves the concealment performance of the light guide structure, improves the luminous effect and achieves the effect of high brightness.

For example, the embodiments of the present disclosure further provides a manufacturing method of the light guide structure, and the method includes: forming the at least two light guide layers 1; and forming the plurality of dot structures 2 between the adjacent ones of the light guide layers 1.

Taking the light guide structure shown in FIG. 2b as an example, in connection with the flow chart of manufacturing the light guide structure shown in FIG. 3, the manufacturing method of the light guide structure will be described below. For example, the manufacturing method of the light guide structure includes the following steps.

Figure 3:
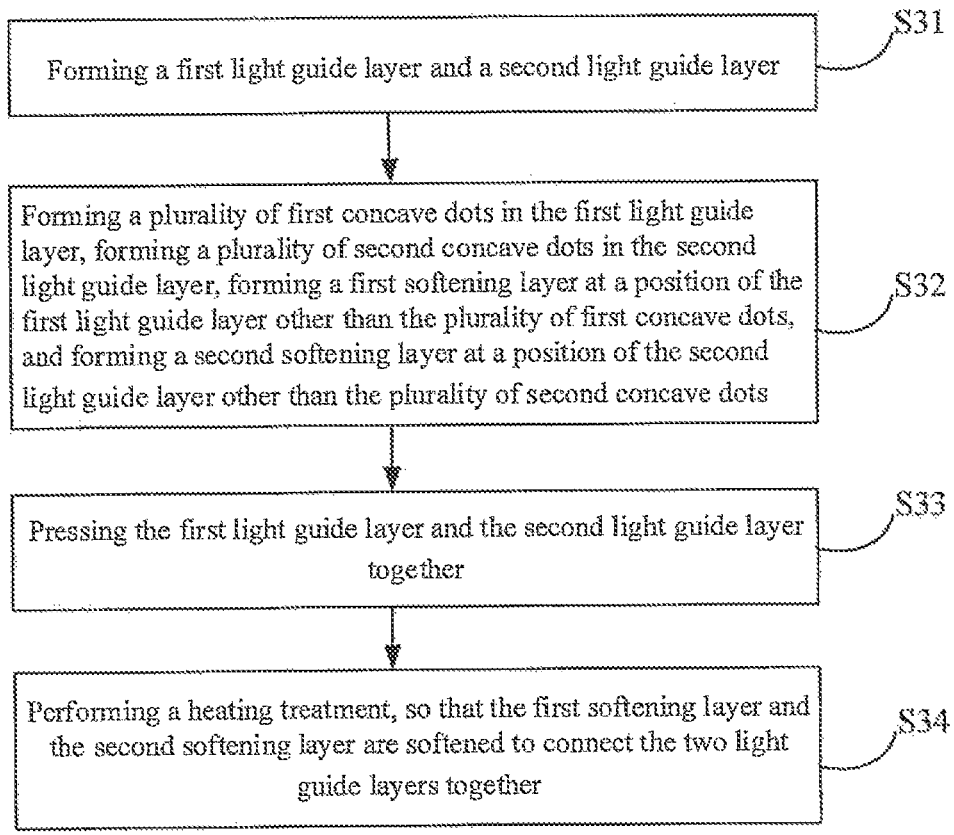
FIG. 3 is a flow chart showing a manufacturing method of the light guide structure according to the embodiments of the present disclosure.

As shown in FIG. 3; in step S31, the first light guide layer and the second light guide layer are formed. For example, the first light guide layer and the second light guide layer are formed by injection molding.

As shown in FIG. 3, in step S32, the first concave dots are formed in the first light guide layer, the second concave dots are formed in the second light guide layer, the first softening layer is formed at position of the first light guide layer other than the first concave dots, and the second softening layer is formed at a position of the second light guide layer other than the second concave dots. For example, the concave dots are respectively formed in the light guide layers by injection molding, or the concave dots are respectively formed in the light guide layers by coating, etching or the like. For example, the concave dots are semicircular; the concave dots may be designed in other shapes as needed. The semicircular concave dots are easier to be processed if processed by laser dotting or the like. The order of forming the first and second concave dots and the first and second softening layers is not limited in the embodiments of the present disclosure. For example, the first concave dots and the second concave dots are formed first, and then the first softening layer and the second softening layer are formed. For example, the first softening layer and the second softening layer are formed first, and then the first concave dots and the second concave dots are formed.

As shown in FIG. 3, in step S33, the first light guide layer and the second light guide layer are pressed together. The first concave dots and the second concave dots are symmetric with respect to the bonding surface between the first light guide layer and the second light guide layer, and the first concave dots correspond to the second concave dots in a one-to-one manner. Because the first concave dots and the second concave dots are all semi-circular, complete circular dots are formed after the first light guide layer and the second light guide layer are pressed together.

As shown in FIG. 3, in step 334, a heating treatment is performed, so that the first softening layer and the second softening layer are softened to connect the two light guide layers together and to avoid the interface caused by that two different light guide layers are directly attached with each other. By heating and softening the first softening layer and the second softening layer, a one-piece structure is formed by the two different light guide layers after the two different light guide layers are bonded with each other, which thereby reduces the optical energy loss caused by the interface between the different light guide layers.

A heating temperature of the heating treatment needs to be determined according to the material of the softening layer. For example, if the softening layer is a transparent ceramic material, the heating temperature is from 80° C. to 100° C.; if the softening layer is a transparent polymer composite material, the heating temperature is from 100° C. to 110° C. The softening layer is heated to the molten state, and after the softening layer is restored to the room temperature, the first light guide layer and the second light guide layer form the one-piece structure, and the dot structures are formed inside the light guide structure.

The light guide structure shown in FIG. 2b is obtained by the steps shown in FIG. 3.

Figure 4:
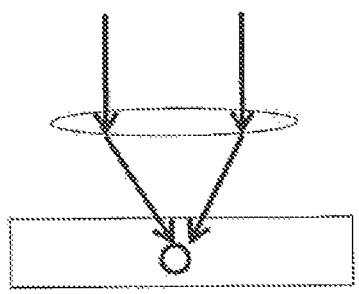
FIG. 4 is a schematic diagram showing another manufacturing method of the light guide structure provided by the embodiments of the present disclosure.

For example, in at least one embodiment of the present disclosure, the light guide structure having the built-in dot structures is formed by using laser light. As shown in FIG. 4, the laser light is converged by a convex lens so that the laser light ablates an interior portion of the light guide structure to form the dot structure. As shown in FIG. 4, a focus of the convex lens is located at a position inside the light guide structure where the dot structure is to be formed. However, this manner has a great difficulty in optical adjustment; and the thickness of the light guide structure suitable for this manner is at least 1.0 mm or more, and the thinner light guide plate or light guide film cannot be realized in this manner.

FIGS. 1a, 1c and FIGS. 2a-2b and related descriptions are exemplified by two light guide layers. In at least one embodiment of the present disclosure, for example, three or even more than three light guide layers are included in the light guide structure. Next, taking three light guide layers included in the light guide structure as an example, in connection with FIG. 3 and FIG. 6, the light guide structure in the embodiments of the present disclosure will be described in detail.

Figure 5:
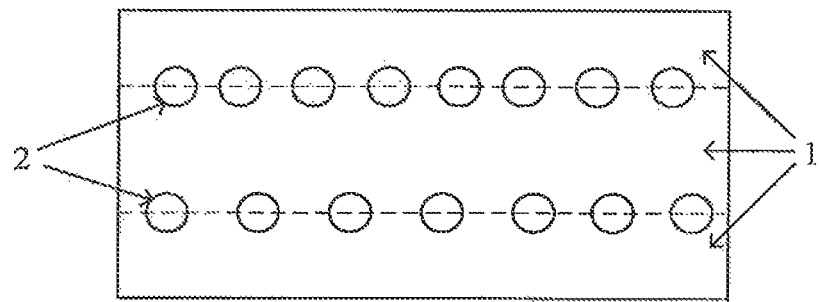
FIG. 5 is another schematic structural view showing the light guide structure according to the embodiments of the present disclosure.

FIG. 5 is another schematic view of the light guide structure according to the embodiments of the present disclosure. The light guide structure is, for example, the light guide plate or the light guide film. As shown in FIG. 5, the light guide structure includes three light guide layers 1, the plurality of dot structures 2 are disposed between the adjacent ones of the light guide layers, and thus two layers of the dot structures are formed inside the three light guide layers 1.

Figure 6:
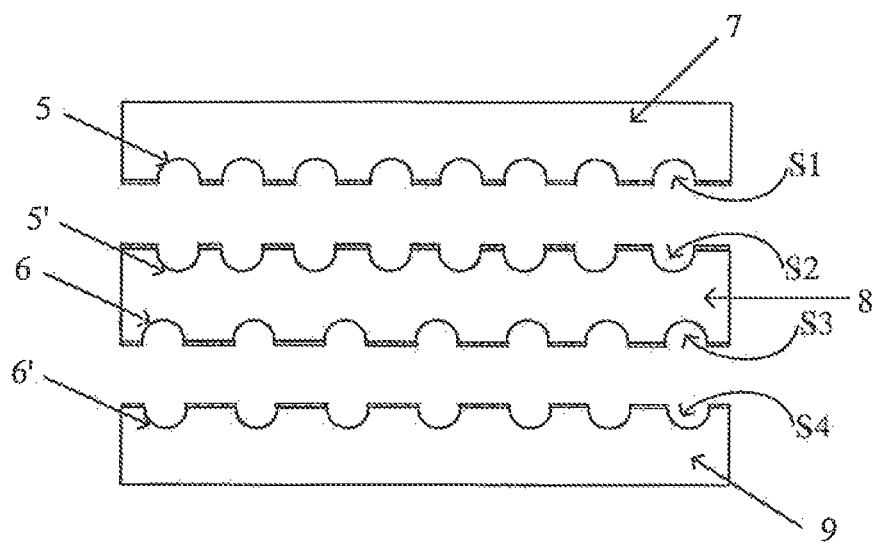
FIG. 6 is a schematic structural view showing the light guide structure before being pressed together according to the embodiments of the present disclosure.

FIG. 6 is a schematic structural view of the three light guiding layers of the light guide structure before being pressed together according to the embodiments of the present disclosure. As shown in FIG. 6, the light guide structure includes the first light guide layer 7, the second light guide layer 8 and a third light guide layer 9; the first light guide layer 7 has a plurality of first concave dots 5 at the first inner surface S1 which faces the second light guide layer 8, the second light guide layer 8 has a plurality of second concave dots 5' at the first inner surface S2 which faces the first light guide layer 7; the plurality of first concave dots 5 and the plurality of second concave dots 5' are corresponding to each other in positions, and form a plurality of dot structures (namely the dot structures of an upper layer in FIG. 5) after the first light guide layer 7 and the second light guide layer 8 are pressed together. The second light guide layer 8 has a plurality of third concave dots 6 at a second inner surface S3 which faces the third light guide layer 9, the third light guide layer 9 has a plurality of fourth concave dots 6' at a first inner surface 54 which faces the second light guide layer 8; the plurality of third concave dots 6 and the plurality of fourth concave dots 6' are corresponding to each other in positions, and form a plurality of dot structures (namely the dot structures of a lower layer in FIG. 5) after the second light guide layer 8 and the third light guide layer 9 are pressed together.

For example, the material of the light guide layers, the material of the softening layers, the sizes of the dot structures, and the density of the dot structures are the same as those of the above-mentioned FIG. 1 and FIG. 2, and are not described herein again.

It should be noted that, in the light guide structure shown in FIG. 5 and FIG. 6, two layers of dot structures are provided, the distribution positions of the dot structures in the two layers of dot structures are not necessarily in a one-to-one correspondence, and the sizes or density of the dot structures in different layers may be different. For example, if the light source is of the direct type (i.e., the light source is disposed at the bottom of the light guide structure), the density of the dot structures in the layer of dot structures near the light source is smaller than the density of the dot structures in the layer of dot structures away from the light source, and/or the size of the dot structures in the layer of dot structures near the light source is smaller than the size of the dot structures in the layer of dot structures away from the light source, and the like. For the sizes and density of the dot structures in the same layer, refer to the above description, and details are not described here.

The light guide structure shown in FIG. 5 and FIG. 6 includes three light guide layers, so that the concealment performance of the light guide structure is better than that of the light guide structure comprising the single light guide layer or the two light guide layers, and the image excellence rate is further improved. For example, the image excellence rate of the conventional light guide structure comprising the single light guide layer reaches 85%, the image excellence rate of the light guide structure comprising the two light guide layers reaches 92% or more, and the image excellence rate of the light guide structure comprising the three light guide layers reaches more than 95%.

Based on FIG. 1 to FIG. 6 described above, a plurality of layers of dot structures are, for example, disposed inside the light guide structure. For example, if two layers of dot structures are included, three light guide layers are stacked; if three layers of dot structures are included, four light guide layers are stacked . . . and so on, that is, the amount of the at least two light guide layers is N, then the light guide structure includes, for example, the dot structures of N-1 layer. In a situation where the amount of the light guide layers in the light guide structure is increased, the structure is similar to that of FIG. 5 and FIG. 6 described above, and the light guide layers having the concave dots are pressed together and are heated to bond into a one-piece structure via the softening layers, so as to realize the light guide structure having the internal dot structures. Which is not described in detail here. How many light guide layers are disposed in the light guide structure needs to be determined in combination with specific design requirements, such as the thickness of the light guide structure, the number of layers of dot structures, the display yield and the like.

In summary, according to the light guide structure provided by the embodiments of the present disclosure, on one hand, the light guide structure is formed by at least two light guide layers, and the plurality of dot structures are disposed between the adjacent ones of the light guide layers, so as to realize that the dot structures of the light guide structure are arranged inside the light guide structure, which improves the image excellence rate; on the other hand, the light guide structure formed of the plurality of light guide layers improves the concealment performance of the product, improves the luminous effect and achieves the effect of high brightness. In addition, the light guide structure having the plurality of light guide layers stacked together greatly improves the duty ratio of the dot structures (i.e., a ratio of a total area of the dot structures to a total area of the light guide layer), and the luminous effect is improved by more than 30%.

Figure 7:
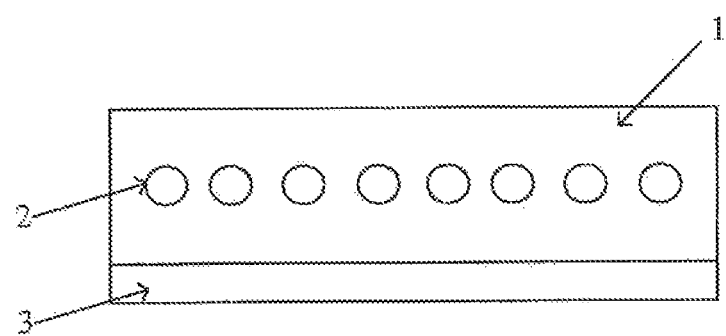
FIG. 7 is a schematic view showing a backlight module according to the embodiments of the present disclosure.

FIG. 7 is a schematic view of a backlight module according to the embodiments of the present disclosure. As shown in FIG. 7, the backlight module includes: the light guide structure described above and a reflective coating layer 3 disposed on a surface of the light guide structure.

The reflective coating layer in the embodiments of the present disclosure is, for example, white ink or white paint, and has a thickness of, for example, 0.02 mm to 0.07 mm. The reflective coating layer acts like a reflective sheet to improve light utilization.

Continuing to refer to the backlight module of FIG. 7, which includes the light guide structure described above, the reflective coating layer 3 disposed on the surface of the light guide structure is, for example, replaced by a reflective sheet, and a thickness of the reflective sheet is at least 0.07 mm.

For example, the backlight module also includes the light source 10 as described above.

The backlight module in FIG. 7 achieves the same technical effects as the above-described light guide structure, and details are not described herein again.

The embodiments of the present disclosure further provides a display device including the backlight module described above and a display panel, the display panel is located on a light emission side of the backlight module; the display device achieves the same technical effect as the light guide structure and the backlight module, and repeated descriptions are omitted herein.

For example, the display device is any product or component having a display function such as a display panel, an electronic paper, a mobile phone, a tablet computer, a television, a display, a notebook computer, a digital photo frame, a navigator, and the like.

What are described above is related to the illustrative embodiments of the disclosure only and not limitative to the scope of the disclosure; the scopes of the disclosure are defined by the accompanying claims.

What is claimed is:

1. A light guide structure, comprising:
   at least two light guide layers;
   a plurality of dot structures between adjacent ones of the light guide layers; and
   a softening is at a position, other than the plurality of dot structures, between the adjacent ones of the light guide layers.

2. The light guide structure according to claim 1, wherein a total amount of the at least two light guide layers is N the light guide structure comprises the plurality of dot structures of N−1 layer, and N is a positive integer greater than or equal to 2.

3. The light guide structure according to claim 2, wherein the at least two light guide layers comprise a first light guide layer and a second light guide layer;
   the first light guide layer has a first inner surface which faces the second light guide layer and has a plurality of first concave dots; the second light guide layer has a first inner surface which faces the first light guide layer and has a plurality of second concave dots; and the plurality of first concave dots and the plurality of second concave dots correspond to each other in positions and constitute the plurality of dot structures.

4. The light guide structure according to claim 3, wherein the softening layer comprises a first softening layer at a position of the first light guide layer other than the plurality of first concave dots of the plurality of dot structures, and a second softening layer at a position of the second light guide layer other than the plurality of second concave dots of the plurality of dot structures.

5. The light guide structure according to claim 2, wherein the at least two light guide layers comprise a first light guide layer, a second light guide layer and a third light guide layer;
   the first light guide layer has a first inner surface which faces the second light guide layer and has a plurality of first concave dots; the second light guide layer has a first inner surface, Which faces the first light guide layer and has a plurality of second concave dots; and the plurality of first concave dots and the plurality of second concave dots correspond to each other in positions and constitute the plurality of dot structures;
   the second light guide layer has a second inner surface, which faces the third light guide layer and has a plurality of third concave dots; the third light guide layer has a first inner surface, which faces the second light guide layer and has a plurality of fourth concave dots; and the plurality of third concave dots and the plurality of fourth concave dots correspond to each other in positions and constitute the plurality of dot structures.

6. The light guide structure according to claim 1, wherein the plurality of dot structures are equal in size and unequal in density, a density of the plurality of dot structures is increased as distances from the plurality of dot structures to a light source become larger, and the light guide structure is configured to receive and transmit light from the light source.

7. The light guide structure according to claim 1, wherein the plurality of dot structures have a same density and unequal sizes, the plurality of dot structures become larger as distances from the plurality of dot structures to a light source become larger, and the light guide structure is configured to receive and transmit light from the light source.

8. The light guide structure according to claim 1, wherein a material of the at least two light guide layers is a transparent resin, and a material of the softening layer is a transparent ceramic material or a transparent polymer composite material.

9. The light guide structure according claim 1, wherein the light guide structure has a thickness of 0.2 mm to 6 mm.

10. The light guide structure according to claim 1, wherein each of the plurality of dot structures is symmetrical with respect to a contact interface between the adjacent ones of the light guide layers.

11. The light guide structure according to claim 10, wherein a cross-sectional shape of each of the plurality of dot structures is a circle in a direction perpendicular to the light guide structure, and a diameter of the circle is from 10 μm to 200 μm.

12. The light guide structure according to claim 1, wherein each of the plurality of dot structures is a hollow dot structure.

13. A backlight module, comprising a light guide structure, wherein the light guide structure comprises:
   at least two light guide layers;
   a plurality of dot structures between adjacent ones of the light guide layers; and
   a softening layer is at a position, other than the plurality of dot structures, between the adjacent ones of the light guide layers.

14. The backlight module according to claim 13, further comprising:
   a reflective coating layer on a surface of the light guide structure.

15. The backlight module according to claim 14, wherein the reflective coating layer is white ink or white paint and has a thickness of 0.02 mm to 0.07 mm.

16. A display device, comprising:
   the backlight module according to claim 13; and
   a display panel on a light emission side of the backlight module.

17. A manufacturing method of a light guide structure, comprising:
   forming at least two light guide layers;
   forming a plurality of dot structures between adjacent ones of the light guide layers; and
   forming a softening layer at a position, other than the plurality of dot structures, between the adjacent ones of the light guide layers.

18. The manufacturing method of according to claim 17, comprising:

forming a first light guide layer and a second light guide layer;

forming a plurality of first concave dots in the first light guide layer, forming a plurality of second concave dots in the second light guide layer, forming a first softening layer at a position of the first light guide layer other than the plurality of first concave dots, forming a second softening layer at a position of the second light guide layer other than the plurality of second concave dots;

pressing the first light guide layer and the second light guide layer together; and performing a heating treatment, so that the first softening layer and the second softening layer are softened to be the softening layer to connect the first light guide layer and the second light guide layer together.

19. The manufacturing method according to claim 17, wherein the plurality of dot structures are formed between the adjacent ones of the light guide layers by laser ablation.

20. The manufacturing method according to claim 19, wherein before the laser ablation, the method further comprises: converging a laser light with a convex lens.

* * * * *